(12) United States Patent
Hedberg

(10) Patent No.: US 6,713,708 B2
(45) Date of Patent: Mar. 30, 2004

(54) PORTABLE DRAWN ARC STUD WELDING APPARATUS AND METHOD PROVIDING HIGH CURRENT OUTPUT IN SHORT TIME INTERVALS

(75) Inventor: Goran Hedberg, Ocean Pines, MD (US)

(73) Assignee: Arcon Welding LLC, Salisbury, MD (US)

( * ) Notice: Subject to any disclaimer, the term of this patent is extended or adjusted under 35 U.S.C. 154(b) by 32 days.

(21) Appl. No.: 10/084,983

(22) Filed: Mar. 1, 2002

(65) Prior Publication Data

US 2003/0164357 A1 Sep. 4, 2003

(51) Int. Cl.⁷ .................................................. B23K 9/20
(52) U.S. Cl. ..................................... 219/98; 219/130.33
(58) Field of Search ..................... 219/98, 99, 130.33, 219/130.21, 137 PS

(56) References Cited

U.S. PATENT DOCUMENTS

| | | | |
|---|---|---|---|
| 4,117,303 A | | 9/1978 | Hedberg |
| 4,152,759 A | | 5/1979 | Hedberg |
| 4,456,808 A | * | 6/1984 | Wilkinson et al. ............ 219/98 |
| 4,804,811 A | * | 2/1989 | Raycher et al. ............... 219/98 |
| 5,313,045 A | * | 5/1994 | Baavhammar ........ 219/137 PS |
| 5,662,820 A | | 9/1997 | Schwiete et al. |
| 5,676,867 A | * | 10/1997 | Allen .......................... 219/98 |

FOREIGN PATENT DOCUMENTS

| | | |
|---|---|---|
| EP | 0 474 031 | 3/1992 |
| JP | 54-025247 | 2/1979 |
| WO | WO 99/31681 | 6/1999 |

* cited by examiner

Primary Examiner—Clifford C. Shaw

(57) ABSTRACT

A stud welder utilizing a frequency inverter which is capable of delivering in access of 1000 A for a short duration of about 1 second using double-sided cooled power semiconductors. The inverter can deliver constant power to the stud circuit or the arc, sense the progress of the stud process, and stop the process if the forecast for an acceptable stud will not be achieved, and detected sufficiently early that the current has not created a stud that can not be removed and repeated. The stud welder also has a circuit capable of delivering a high voltage pulse capable of penetrating paint covering the base metal, and thereby enabling better stud welding to painted material. The stud welder and method also monitor the ending energy delivered and adjust it to the energy required. The stud welder further has a battery or capacitor storage device to reduce the fuse size used by storing the energy needed when a stud is formed by charging the storage device when no power is needed.

3 Claims, 10 Drawing Sheets

PORTABLE DRAWN ARC STUD WELDING APPARATUS AND METHOD PROVIDING HIGH CURRENT OUTPUT IN SHORT TIME INTERVALS

BACKGROUND OF THE INVENTION

1. Field of the Invention

The present invention is directed to a drawn arc stud welder apparatus and method, and more particularly to a portable drawn arc stud welding apparatus and method providing high current output in short time intervals.

2. Description of the Related Art

Stud welding is the process of welding a metal stud, acting as an electrode, to a metal surface, without penetrating the surface. The stud welding process and welder apparatus use a gun where the stud is inserted into the gun to be fastened to a base metal. The gun is positioned over the base metal, with the stud touching. A power supply delivers a high current that starts to flow through the stud to the base metal by the user depressing the trigger of the gun. As the current starts, the stud is pulled back about ⅛ inch, thereby creating an arc. After 0.2 to 1.2 seconds, the current is stopped and the stud is thrust into the created molten puddle, securing the stud to the base metal.

U.S. Pat. No. 5,662,820 generally describes a process for drawn arc stud welding using a control or regulation of the current flow of the main current electric arc.

Inverter-type power technology has been adopted for welding processes and apparatus. The first inverter welder called PowCon was introduced around 1976. The inverter power technology has replaced the conventional power supplies for welders in many applications.

However, inverter-type power technology generally has been considered not suitable for stud welding applications. This is because there are repeated high current surges, 800 to 2000 Amperes (A), delivered during short time intervals of 0.1 to 1.5 seconds during the drawn arc stud welding process. The conventional inverter power unit using single sided cooled power semiconductor silicon chips increase their temperature due to their inferior cooling so much they have not been suitable for stud welding. This has forced the stud welders to be much heavier, e.g., up to 750 lb., than welders, e.g., of 80 lbs. in weight, using inverter power units for other types of applications.

Today's conventional technology for fastening studs is accomplished by a stud welder using a heavy 50/60 Hz transformer/rectifier. This significantly contributes to the overall heavy weight of the stud welder apparatus.

A stud welder LBH 1400 from BTH Heberle Gmbh, Germany, delivers 1400 Amps capable of welding ⅝ inch (16 mm) full base studs and weighs 300 lb. (135 Kg.). This stud welder is a conventional transformer/rectifier type, weighing as much as conventional welding machines. It consists of a transformer and SCR bridge which enables the current to vary from 0 amps to 1400 A.

A stud welder DS 312 from OBO Betterman, is capable of delivering 900A and weighs 152 lb. (69 Kg).

A stud welder Nelweld 3000 from Nelson is capable of delivering 1400 A and weighs 725 pounds.

All of the above stud welding machines are 50/60 HZ based on transformer SCR phase angle control.

Another stud welder machine from Nelson uses an inverter-type power supply capable of delivering 800 A, 6% duty cycle and weighing 36 lbs (16 Kg). This machine, however, is based on IGBT transistors in an inverter circuit. This inverter-based IGBT power semiconductor is capable of carrying only 20% of the current than an inverter-based SCR power semiconductor is capable of. The power diode is also only single-side cooled and therefore also capable of only delivery of 25% of the current than the power diode used for the invention as described hereafter.

Patent publication WO 99/31681 describes a planar-type transformer suitable for inverters. This patent publication mentions that this type of transformer is suitable for inverters for stud welding, in addition to other types of inverters.

Patent publication EP0474031A3 relates to an inverter-type of power control unit for stud welding and describes the function of an inverter.

Patent publication JP54-025247 relates to a power source for stud welding and describes a circuit to keep the current constant and thereby deliver constant heat. The stud is melted off thereby increasing the arc length. When the arc length increases the arc voltage also increases. If the arc current is kept constant, the power in the arc increases and melting off speed increases. This is a run off condition, stopped by limited supply voltage and duration of the stud process. This method does not use a power source designed to deliver constant power.

Stud welders and methods in the related art continue to have problems because they cannot deliver repeated high currents in a short duration without sacrificing other significant functions and conditions, such as reliability, weight, manufacturing costs, and the like.

SUMMARY OF THE INVENTION

One aspect of the invention is to provide a stud welder apparatus and method that overcome the problems of the conventional stud welding apparatus and methods.

Another aspect of the invention is to provide a stud welder apparatus and method capable of currents of 1000 A or greater, and which enables such high currents to be delivered under approximately a second without sacrificing function, reliability or other operational conditions.

Yet another aspect of the invention is to provide a stud welder apparatus using an inverter power supply, but which reduces the extreme stress on the power semiconductors due to the high currents and resulting high and rapid temperature swings.

Another aspect of the invention is to provide a stud welder apparatus which is not only capable of high currents in short time durations, but which is more portable by being lighter in weight.

One aspect of this invention is to provide a stud welder apparatus and method employing an inverter, which is very suitable for delivering high current during short time intervals, by using sturdy medium frequency double-sided cooled SCR's and double-sided cooled power diodes.

Another aspect of this invention is to provide a stud welder inverter very suitable to deliver constant power to the arc, thereby guaranteeing constant energy being delivered to each stud or from stud to stud.

Another aspect of the invention is to provide a stud welder capable of measuring the resistance in the circuit without the arc, by sending a small current through the cables and stud in order to measure the resistance. This information is used to keep the true arc power constant by calculating the voltage drop in the cable and multiply by the current preset on a digital display and subtracting this from the voltage supplied in order to calculate the arc voltage. This true arc voltage is also used to automatically control the arc distance by measuring the total voltage and subtracting the preset current multiplied by the measured resistance to get the true arc voltage. This true arc voltage is continuously monitored and calculated and kept constant by moving the stud downwards as it melts off, created by the current.

Yet another aspect of the invention is to provide a stud welder with a high voltage generator that, when the base material is coated with paint, grease or corrosion, a high voltage pulse is applied between the tip of the stud and base material, penetrating the paint and providing a current path for following stud current. This function makes it possible to provide improved stud welding even on painted material.

Another aspect of the invention is to provide a stud welder inverter that makes it possible to control the shape of the pulse 50 times faster than when using 50/60 Hz. This feature makes it possible to use the first millisecond to ramp up from 0 Amp to the set amps, reducing spatter and loss of material.

Another aspect of this invention is to provide a stud welder having a drawn arc stud welding processing circuit with an electrical storage device to reduce current surge.

Various of the above aspects can be attained by a stud welder apparatus comprising a drawn arc stud applying device and a drawn arc stud processing circuit that delivers a current of 1000 amps (A) or greater to the drawn arc stud applying device, the processing circuit including an inverter having at least one double-sided cooled switching semiconductor.

For the above stud welder apparatus, as embodied herein, the inverter includes double-sided cooled secondary side diode semiconductors.

For the above stud welder apparatus, as embodied herein, the switching semiconductor can comprise double-sided cooled primary side SCR semiconductors.

For the above stud welder apparatus, as embodied herein, the processing circuit delivers the current in short intervals of approximately 0.20 to 1.2 seconds for applying studs.

For the above stud welder apparatus, as embodied herein, the processing circuit can further include a high voltage generator and wherein the processing circuit applies a voltage at approximately the same time as a spark from the gun to penetrate an insulating layer on a base to be stud welded and create a conductive path for the stud current.

Various of the above aspects also can be attained by stud welder apparatus comprising a drawn arc stud applying device and a drawn arc stud processing circuit that provides a constant power to the drawn arc stud applying device, the processing circuit including an inverter having at least one double-sided cooled switching semiconductor.

For the above stud welder apparatus, as embodied herein, the processing circuit can maintain the frequency constant to provide the constant power.

For the above stud welder apparatus, as embodied herein, the processing circuit can measure the current, multiply the current and voltage, and adjust the current to provide the constant power.

For the above stud welder apparatus, as embodied herein, the processing circuit can measure the voltage, multiply the current and voltage, and adjust the voltage to provide the constant power.

Various of the above aspects also can be attained by a stud welder apparatus comprising a drawn arc stud applying device; and a drawn arc stud processing circuit that measures the progress of making the stud and stops a supplying of current to the stud applying device if the progress indicates that the stud will not receive sufficient energy at the end of the stud process in sufficient time that the stud making process can be stopped before an unacceptable stud has been created.

Various of the above aspects also can be attained by a stud welder apparatus comprising a drawn arc stud applying device; and a drawn arc stud processing circuit that continuously measures the degree of melting off when making the stud and stops delivery of energy to the stud applying device if the melting off progress indicates that the stud will not receive sufficient energy at the end of the stud process in sufficient time that the stud process can be stopped before an unacceptable stud has been created by pulling back the stud before a molten stud has cooled down.

Various of the aspects also can be attained by a stud welder apparatus comprising a drawn arc stud applying device; and a drawn arc stud processing circuit that, after the current starts to be delivered, increases the arc length caused by current melting of the stud, and moves the stud towards a base metal to be welded with a speed equal to the stud melting speed, thereby keeping the arc length constant by measuring the arc voltage and regulating the position of the stud to achieve a constant set arc voltage.

Various of the aspects also can be attained by a stud welder apparatus comprising a drawn arc stud applying device; and a drawn arc stud processing circuit that measures the resistance of the stud, cables and gun without an arc voltage, the circuit delivering a reduced current of approximately 10 amps while the stud in the gun touches a base metal to be welded, measuring the resistance before the arc is established, calculating arc voltage, and controlling the movement back of the stud to achieve the desired arc voltage.

For the above stud welder apparatus, as embodied herein, the processing circuit can increase the current with a controlled rate.

For the above stud welder apparatus, as embodied herein, the processing circuit can decrease the current with a controlled rate.

For the above stud welder apparatus, as embodied herein, the processing circuit, starting from the start of the stud process with the arc length and not touching a base metal to be welded with a stud, can deliver a voltage spike powerful enough to make a spark between the tip of the stud and base metal to be welded.

Various of the above aspects also can be attained by a stud welder apparatus comprising a drawn arc stud applying device; and a drawn arc stud processing circuit that measures energy at regular time intervals, extrapolates a forecasted ending energy based upon a predetermined energy, and adjusts at time intervals a current to the stud applying device so that the ending energy is correct.

For the above stud welder apparatus, as embodied herein, the processing circuit can calculate by extrapolation total energy that will be delivered after the stud process is completed by calculating continuously during the stud process an accumulated watt seconds per accumulated millisecond and continuously adjusting the current so as to arrive at a total desired watt seconds when the stud process is terminated.

Various of the above aspects also can be attained by a stud welder apparatus comprising a drawn arc stud applying device; and a drawn arc stud processing circuit that stores energy during periods of no stud current and discharges the energy during a time period when current is needed to apply the stud.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
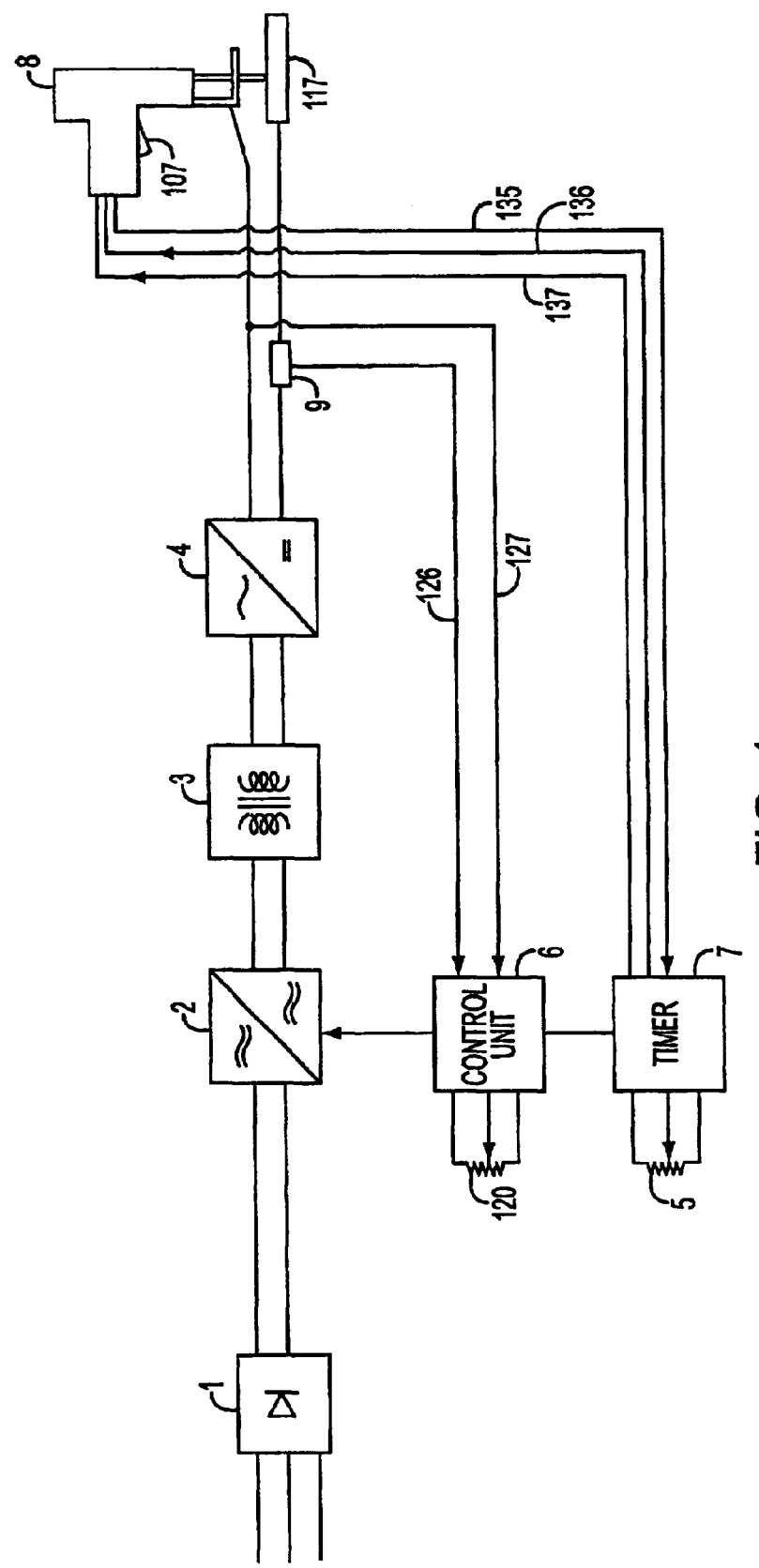
FIG. 1 is a block diagram showing an overall stud welding apparatus having an inverter power supply, inverter controller, timer gun solenoid driver and stud gun, according to a preferred embodiment of the invention.

In accordance with a preferred embodiment of the present invention, a stud welder uses a frequency inverter of the series-capacitor type having double-sided cooled hockey puck type thyristors as switching elements, and double-side cooled hockey puck type power diodes.

There are advantages afforded by such frequency inverters in that they are of simple construction, are relatively light in weight, are less expensive to manufacture and are capable of dealing with high or powers. This is especially advantageous with large currents during short time intervals as in stud welding.

The Diode

The silicon chip in the secondary side diode is subject to great thermal stress, which increases from 50 degree centigrade at the end of the cooling off cycle to up to 200 degree centigrade at the end of the 1-second, 2000 A stud welding pulse. This time is too short for the heat sink to cool down the chip effectively. The temperature rise is limited by the diameter of the chip, the mass of the silicon chip, and the percentage of the surface of the chip facing the heat sink. An important factor to limit the temperature rise is that the diode is cooled from both sides. An example of this is the hockey puck diode CXC170 from Westcode. When cooled from both sides, the maximum current increases from 114 A to 438 Amp, or almost 4 times.

The Silicon Controlled Rectifier (SCR), or Thyristor

In order to achieve a high current, for example 300 A, double-sided cooled hockey puck large diameter SCR chips are used, which have high current-carrying capacity and medium frequency (5000 HZ). Other types of power semiconductors, such as high frequency IGBTs, have a lower current-carrying capacity than an SCR of the same chip area and are rated at higher frequency, approximately 50,000 Hz.

A Westcode SCR type P202C demonstrates the difference between single-sided and double-sided cooling. The maximum continuous current when using a single-side cooled SCR is 120 A. When double-sided cooled, the maximum continuous current is 330A, close to an increase of 3 times.

When using IGBT's, the current is further reduced. This is exemplified by comparing the SCR P202C with 10 times higher I square T (63,900 A square seconds) compared with a 200 A IGBT with 6,000 A square seconds. This also makes it necessary to use fuses to protect the IGBT. The SCR, with its ten times higher values, makes it possible to use fast circuit breakers to protect the SCR instead of fuses as for IGBT's.

Accordingly, preferred embodiments of this invention comprise a frequency inverter of the series-capacitor type having small internal damping and having switching elements in the form of SCRs. The inverter further comprises a transformer having a primary winding and one center tapped secondary winding, the primary winding being connected in series to at least one working capacitor, and voltage limiting means effective to limit the voltage across the transformer and the at least one working capacitor to a predetermined voltage value.

Figure 8:
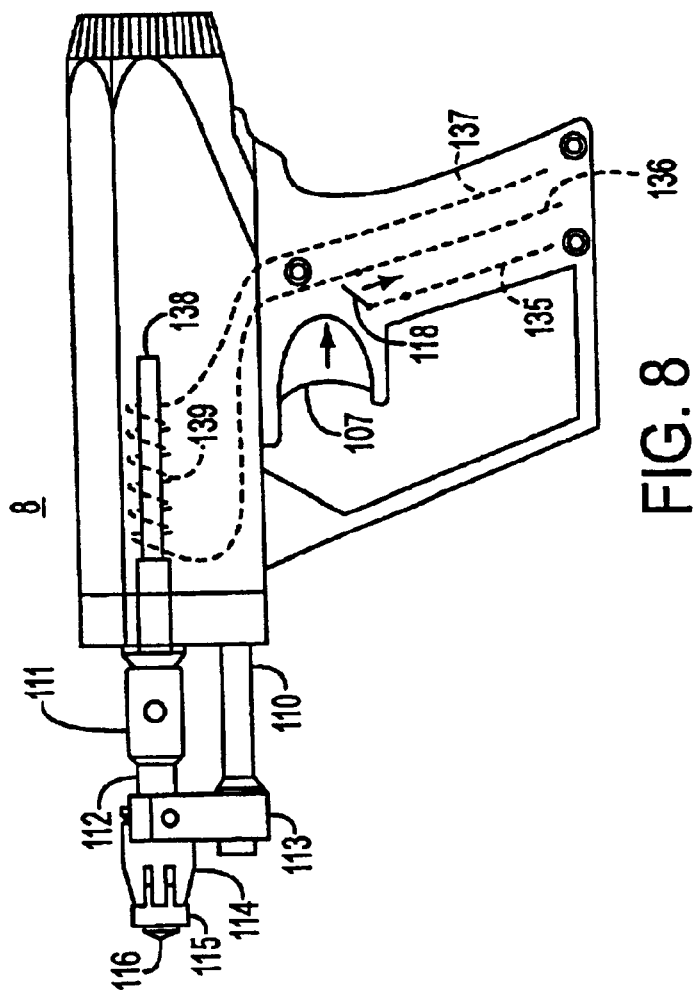
FIG. 8 is an illustrative view showing a gun for holding and moving a stud for the stud welding apparatus according to a preferred embodiment of the invention.

According to a preferred embodiment of the invention and as shown in FIG. 1, there is provided a stud welding apparatus comprising a diode rectifier 1, a frequency inverter 2, a transformer 3, and a rectifier 4, supplying direct current to a stud gun 8. The output frequency of the inverter 2 is controlled, and the inverter may comprise an oscillator delivering control pulses to invert so as to increase and decrease the current to the stud gun. A potentiometer 5 sets the length of the stud current pulse, from a timer 7. A shunt 9 measures the current and is connected, via line 126, to a controller 6 that regulates the current to the value set on a potentiometer 120. A conductor 127 measures the open circuit voltage and is connected to controller 6 to keep this open circuit voltage lower than an allowed voltage. The gun 8 has a pistol trigger 107 that moves a switch 118 that starts the current to the stud signaling the timer to start the timing sequence, transmitted by cable or line 135 to timer 7. The timer 7 sends out current via cables 136 and 137 energizing a coil 139 in the gun 8, thereby pulling the stud away from the base metal 117 and establishing an arc. This is also shown in FIG. 8 and described further hereafter. The stud is then fastened to the base metal 117, in accordance with the drawn arc stud process.

In a modified embodiment of the invention, the stud welder apparatus utilizes the processing circuit, such as shown in FIG. 1, to measure energy at regular time intervals, to extrapolate a forecasted ending energy based upon a predetermined energy, and to adjust at time intervals the current to the stud gun 8 so that the ending energy is correct. Preferably, the circuit calculates by extrapolation a total energy that would be delivered after the stud process is completed by calculating continuously during the stud process an accumulated watt seconds per accumulated millisecond and continuously adjusts the current so as to arrive at a total desired watt seconds when the stud process is terminated. This method can be achieved by taking measurements via lines 126 and 127 as inputs to control unit 6, along with appropriate timing intervals from timer 7. The control unit 6 can store the appropriate data and provide the appropriate commands through inverter 2, transformer 3, and rectifier 4 to adjust the current. In another modification, this processing circuit can maintain constant power to the drawn arc of the gun 8 by either maintaining the frequency constant to provide a constant power, or measuring the current, multiplying the current and voltage, and adjusting the current to provide constant power, or measuring the voltage, multiplying the current and voltage, and adjusting the voltage to provide the constant power. Again, the control for the above alternative methods can be performed using control unit 6.

Figure 2:
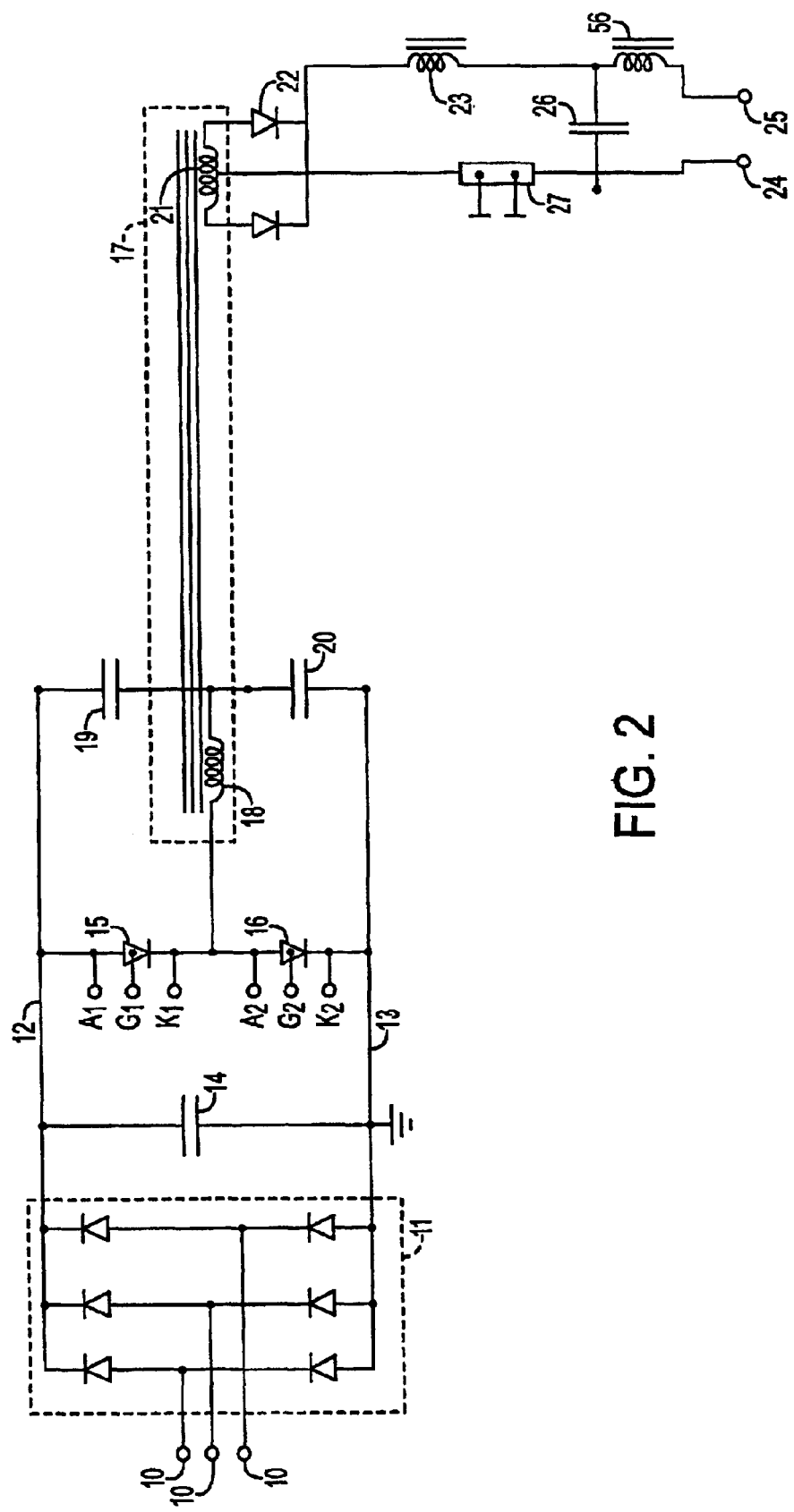
FIG. 2 is a diagram showing an inverter circuit for the stud welding apparatus, according to a preferred embodiment of the invention.

A frequency inverter having the circuit shown in FIG. 2 is connected at 10 to a three-phase alternating current main supply. The input current is rectified in a six-element full-wave rectifier 11, the rectified output voltage on the lines 12, 13 being smoothed by a buffer capacitor 14. Switching elements of the frequency inverter are thyristors 15, 16, which are controlled so as to be conductive alternately. A transformer 17 of the frequency inverter has a primary winding 18 connected in series with working capacitors 19, 20, and a secondary winding 21 connected to terminals 24, 25 via a rectifier half center tapped bridge 22 and a main inductor 23 and an output inductor 56.

A capacitor 26 is connected between the terminal 24, and the output inductor 56. When the frequency inverter is used as a source of stud welding current, it can be used for maintaining a desired open-circuit voltage. A shunt 27 is provided for measuring the output current, the output voltage across the shunt being used to control the frequency inverter, to deliver the desired current to the stud.

Figure 3:
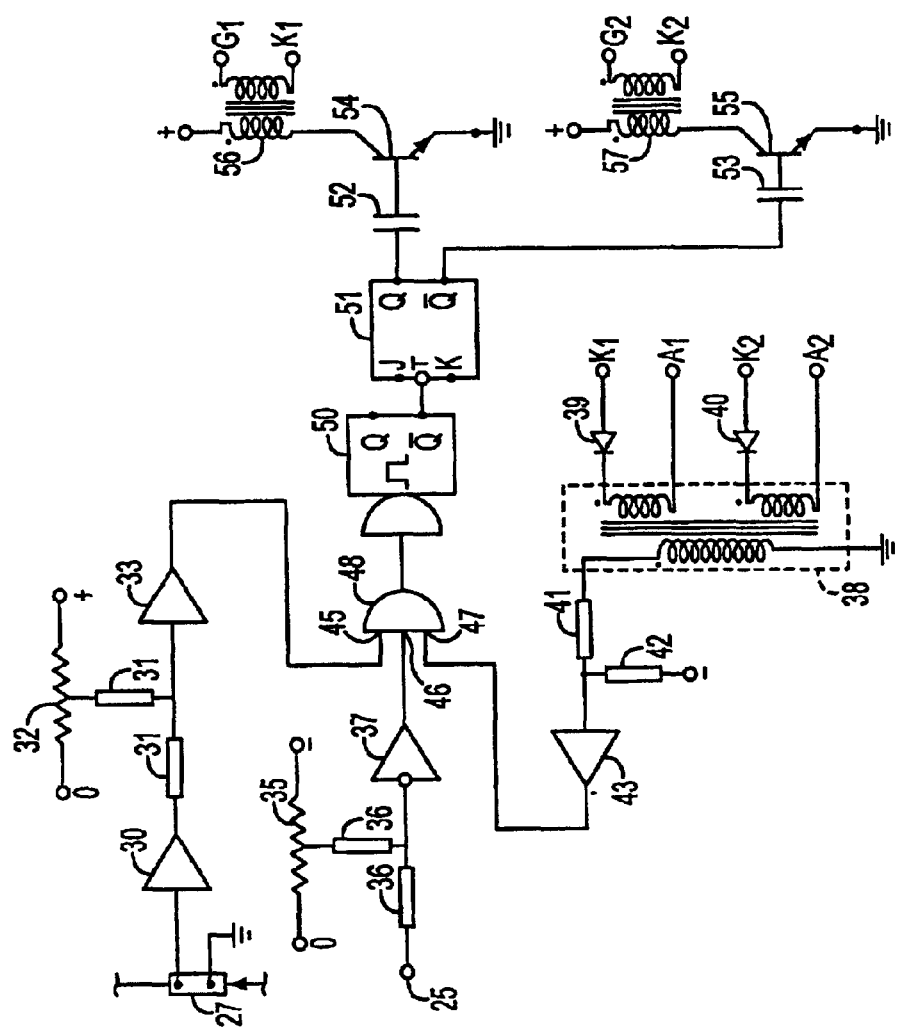
FIG. 3 is a diagram showing a control circuit for the inverter of the stud welding apparatus according to a preferred embodiment of the invention.

A1 and K1 at thyristor or SCR 15 in FIG. 2 are connected at A1 and K1 shown in FIG. 3 to detect when thyristor or SCR 15 has stopped conducting and is ready to block voltage as shown in FIG. 3 and described below. The thyristor or SCR 16 is then given a gate triggering pulse over G2 and K2 making SCR 16 conduct from pulse transformer 57 (FIG. 3). The same is repeated for A2 and K2 at thyristor 16 in FIG. 3 to detect when thyristor or SCR 16 has stopped conducting and SCR 15 is then triggered by receiving a pulse over G1 and K1 from pulse transformer 56 (FIG. 3).

In the control circuit for the inverter as shown in FIG. 3, one terminal of the shunt 27 is connected to ground and the other terminal is connected to an amplifier 30 which amplifies the signal of the shunt 27 from a millivolt level to a volt level. The amplifier 30 is connected, via comparison resistors 31, to a current adjusting device 32 in the form of a potentiometer, and to an amplifier 33 which serves as a level discriminator. The current adjusting device 32 serves to set the desired output current from the frequency inverter. For setting the desired maximum output voltage from the frequency inverter, there is provided a voltage adjusting device 35 in the form of a potentiometer which is connected, via comparison resistors 36, to the terminal 25 of the frequency inverter and to an amplifier 37 which serves as a level discriminator. For controlling the states of the SCRs 15, 16, there is provided a sensing circuit comprising a transformer 38 whose primary is connected, via diodes 39, 40, to anodes A-1, A-2 and cathodes K-1, K-2 of the SCRs 15, 16. One end of the secondary winding of the transformer 38 is grounded and the other is connected to a comparison circuit comprising two resistors 41, 42, the resistor 42 having one end connected to a constant negative voltage. The junction between resistors 41, 42 is connected to an amplifier 43 which serves as a level discriminator and the changeover point of which is determined by the resistors 41, 42 and the constant negative voltage. Each of the amplifiers 33, 37 and 43 is connected to a respective one of inputs 45, 46, 47 of an AND gate 48 which operates in a known manner. Thus the AND gate 48 can only provide an output signal when the output signal from the amplifier 33 is positive, i.e., when the load current measured by the shunt 27 is less than the value for which the adjusting device 32 is set. Correspondingly, it is necessary for the output signal from the amplifier 37 to be positive, i.e., for the load voltage on the terminal 25 to be less than the value set on the adjusting device 35. Finally, the output signal from the amplifier 43 must be positive, which means that the anode voltage of one of the SCRs 15 or 16 is negative in relation to its cathode, which in turn means that both SCRs 15 and 16 are de-energized.

The output of the AND gate 48 is connected to an input of a monostable flip-flop 50 which has a pre-determined pulse period corresponding to the recovery time of the SCRs 15,16, for example 30 μs. Thus, on output Q of the flip-flop 50 there is obtained a positive voltage pulse for a period of time corresponding to recovery time of the SCRs 15, 16. The pulse is applied to trigger input T of a JK flip-flop 51, so that the JK flip-flop 51 changes the states of its outputs at the end of the pulse from the flip-flop 50. The outputs Q, $\overline{Q}$ (overscore) of the JK flip-flop 51 are connected to base electrodes of respective transistors 54, 55 via capacitors 52, 53. Emitters of the transistors 54, 55 are connected to ground while their collectors are connected to the primary winding of respective ignition transformers 56, 57 for the SCRs 15,16. The other ends of the primary windings are connected to a terminal having a pre-determined positive potential. The signals from the outputs of the JK flip-flop 51 will alternately render the transistors 54, 55 conductive via the capacitors 52, 53, for a short period of time determined by the capacitors 52, 53, amplified by transistors 54 and 55 and energizing transformers 56 and 57, thereby delivering a trigger pulse to the secondaries to the gates via G1, K1, and G2, K2. Therefore, the SCRs 15, 16 alternately receive a short ignition pulse and thereby alternately supply current to the primary winding 18 of the transformer 17 to produce an alternating current whose frequency is determined by the input signals on the inputs 45, 46, 47 of the AND gate 48.

Figure 4:
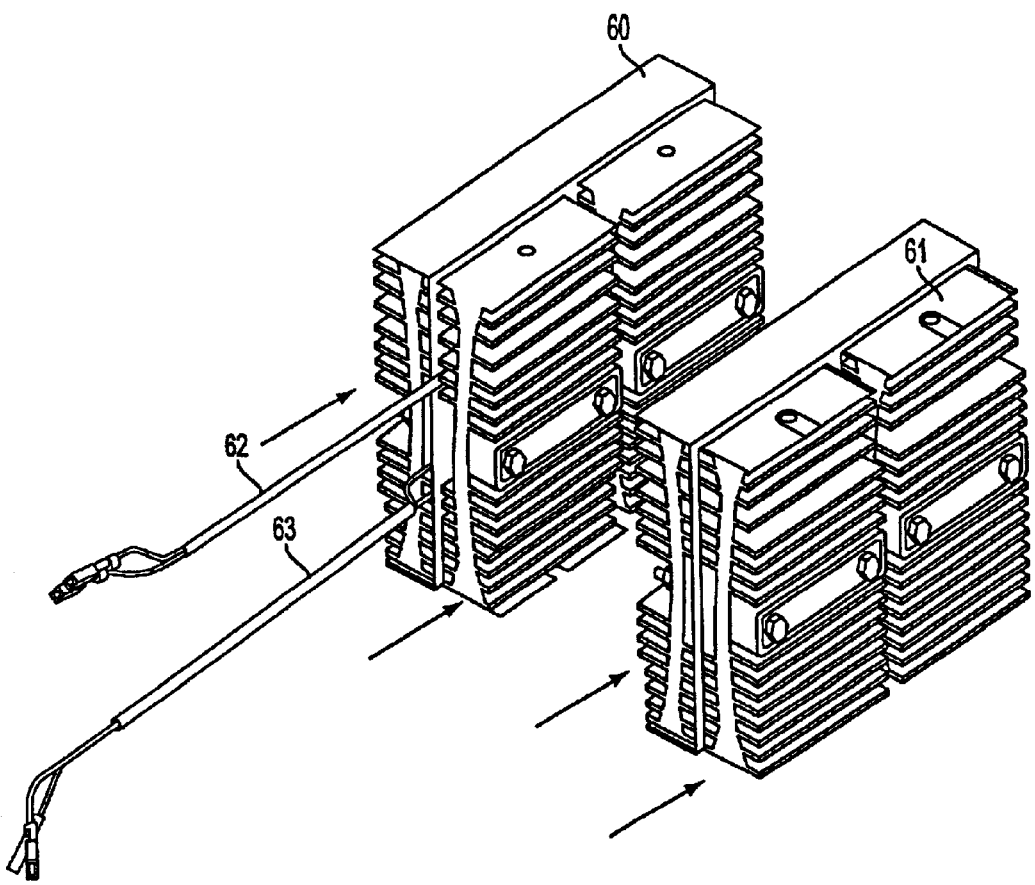
FIG. 4 is an illustrative view showing an assembly with heat sinks and a double sided cooled silicon-controlled rectifier (SCR) and a double sided cooled diode, and related airflow of the assembly for the stud welding apparatus according to a preferred embodiment of the invention.

FIG. 4 is an illustrative view showing a heat sink assembly 61 for output diodes, and a heat sink assembly 60 for SCRs. Gate leads 62 and 63 are connected to gate drive circuit 38 to secondary windings terminals A1, K1, A2 and K2 (FIG. 3).

The assembly heat sinks are cooled by laminar flow along the cooling fins. As embodied herein, each heat sink assembly contains two hockey puck double-sided cooled semiconductors. For example, the heat sink assembly 60 contains two double sided cooled hockey puck SCR's, and the heat sink assembly 61 contains two double sided cooled hockey puck diodes.

Figure 5:
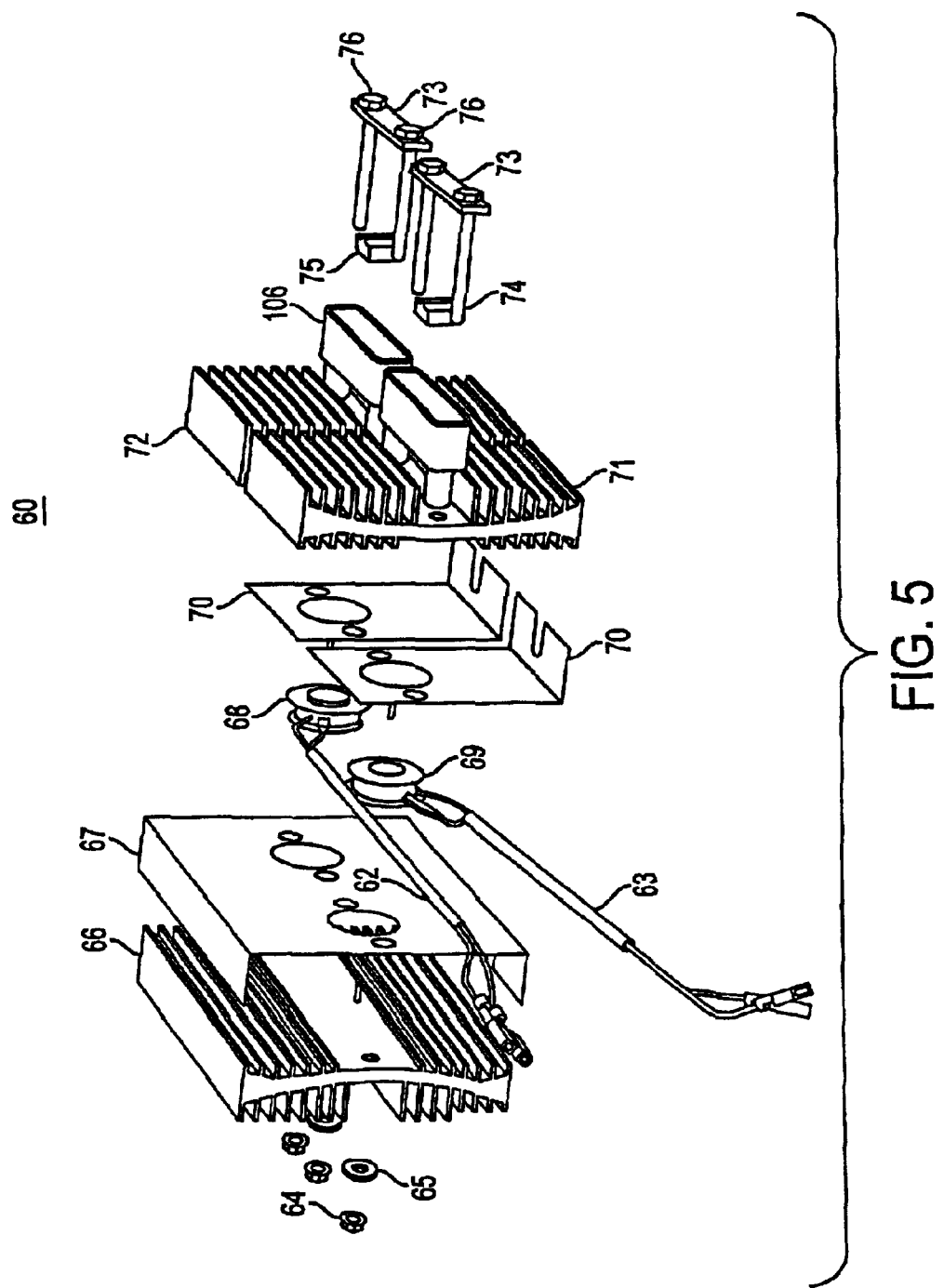
FIG. 5 is an exploded illustrative view of an SCR assembly for the stud welding apparatus according to a preferred embodiment of the invention.

FIG. 5 is an exploded view of a heat sink assembly, such as assembly 60 of FIG. 4, containing two hockey puck SCR's, cooled from both sides.

In the heat sink assembly 60, a heat sink 66 cools SCRs 68, 69 from the left side by heat sink element 66. NOMEX sheets 67 and 70 prevent arc-over between heat sinks elements 66, 71, and 72. The right side of the SCRs are cooled by heat sink elements 71, 72. The two sides of the heat sinks are held together with 900 lbs. of force by bolts 76, 74, brackets 73, washers 65, and nuts 64. The equal stress in the bolts is ensured by a fulcrum 75. Insulator 106 ensures there is no arc-over between the heat sinks.

Figure 6:
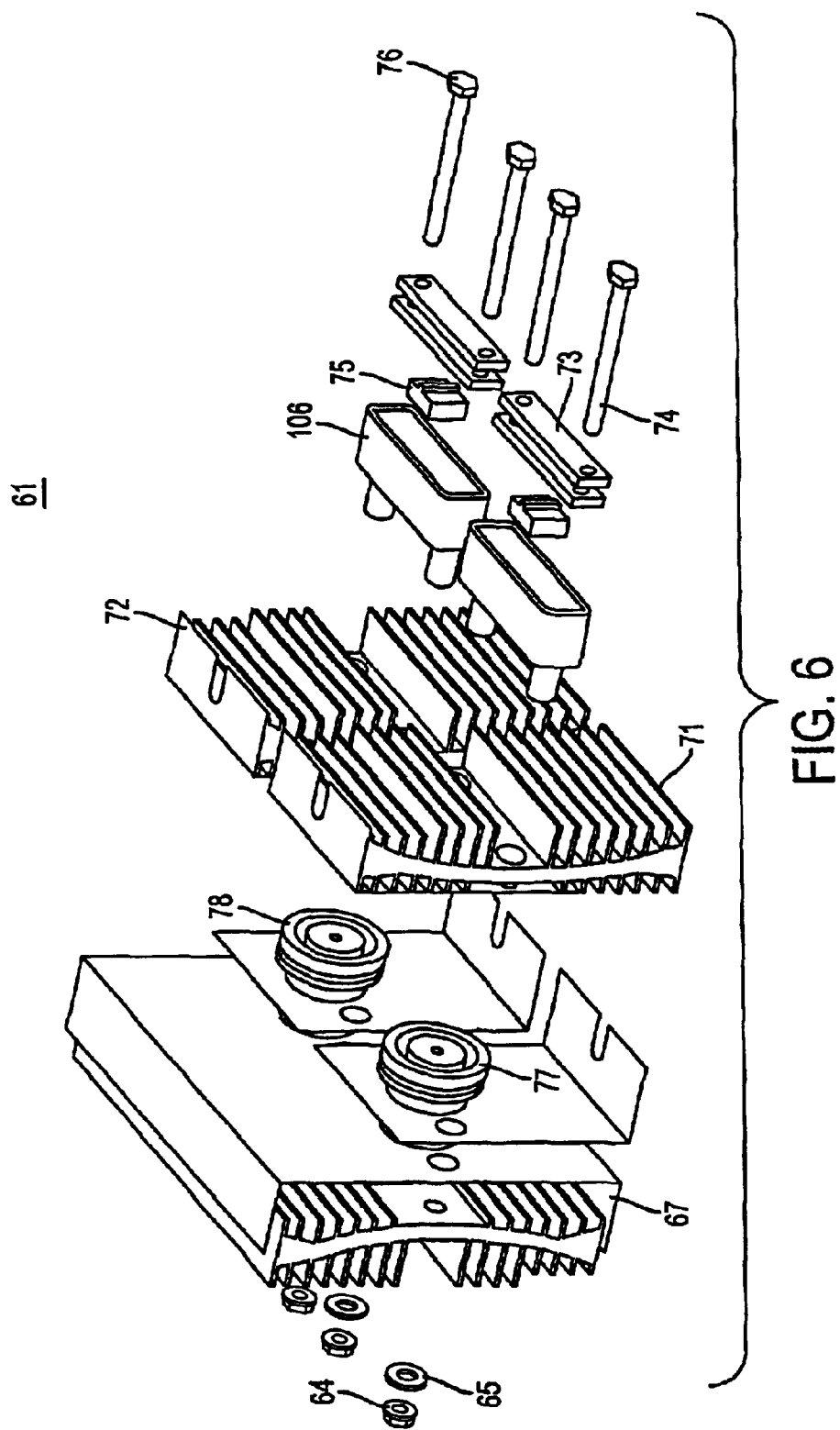
FIG. 6. is an exploded illustrative view of a Diode assembly for the stud welding apparatus according to a preferred embodiment of the invention.

Similar to the heat sink assembly for the SCRs, FIG. 6 shows the details of a heat sink assembly, such as assembly 61 shown in FIG. 4, containing two hockey puck diodes 77, 78. Both diodes are double-sided cooled by the heat sink elements contacting both sides of the semiconductor chip and airflow between the elements and their outside ensuring four times the current carrying capability compared to singe side cooled semiconductors, such as IGBT's.

Figure 7:
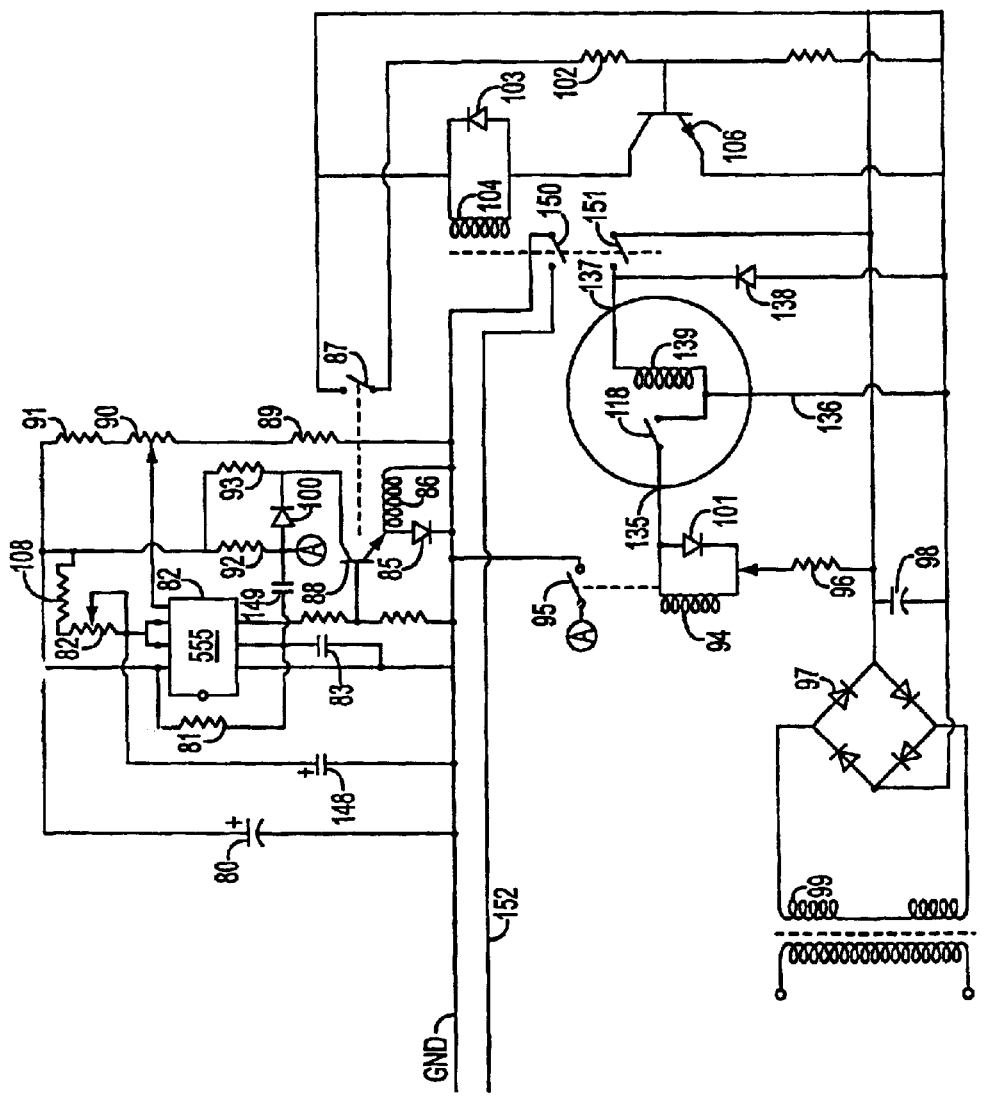
FIG. 7 is a diagram showing a timer circuit and circuit delivering the current for a gun solenoid to move the stud for the stud welding apparatus according to a preferred embodiment of the invention.

FIG. 7 is a circuit diagram showing the timer/gun solenoid driver. The timer is powered by a 15-Volt supply filtered by an electrolytic capacitor 80. Resistor 81 and capacitor 83 prevent oscillator 555, operating in a known manner, to be triggered a second time before the set time has elapsed. The time generated by the oscillator is set by potentiometer 82, and capacitor 148. Resistors 89, 91 and potentiometer 90 are used to calibrate the potentiometer 82, to ensure that the scale front of the display panel is correct.

Gun switch 118 starts the stud sequence. When gun switch 118 is closed, current is delivered to relay coil 94, and thereby closing contact 95, delivering a starting pulse through capacitor 149, and voltage to transistor 88, through diode 100, driving coil 86, and operating switch 87. Diode 85 prevents transients to appear over transistor 88. The switch 87 delivers current through resistor 102, to the base of transistor 106, relay coil 104, closing contact 150, thereby sending a start command to inverter remote input 152, making the inverter start delivering current to the gun 8 as shown in FIG. 1.

Relay coil 104, also closes contact 151, delivering current to the gun solenoid 139. See also FIG. 8. The gun solenoid moves the stud up when the current starts flowing, thereby creating an arc.

The gun solenoid is powered by transformer 99, diode bridge 97, and smoothing capacitor 98. In FIG. 7, a resistor 108 determines a minimum time that can be achieved, diode 101 prevents voltage spikes from coil 94, resistor 96 limits the voltage to coil 94, diode 138 eliminates voltage spikes from coil 139, diode 103 prevents voltage spikes from coil 104, resistor 92 and capacitor 149 comprise a timing circuit to eliminate a contact bounce or double triggering of switch 118, and resistors adjacent transistor 88 limit the current through the transistor to safe levels.

FIG. 8 is an illustrative view showing a gun 8 for applying studs to a base metal. The front end of a stud 116, and ferrule 115, are held in place by a ferrule grip 114. A foot piece 113, in conjunction with leg 110, holds the stud 116 the correct distance relative to the ferrule 115. A chuck 112 is connected to a magnetic moveable core 138, which moves the stud backwards as soon as current is supplied to coil 139, started by closing a contact 107, connected to points 135, 136 of the coil 139. The chuck adapter 111, connects the chuck 112 to the moveable core 138.

Figure 9:
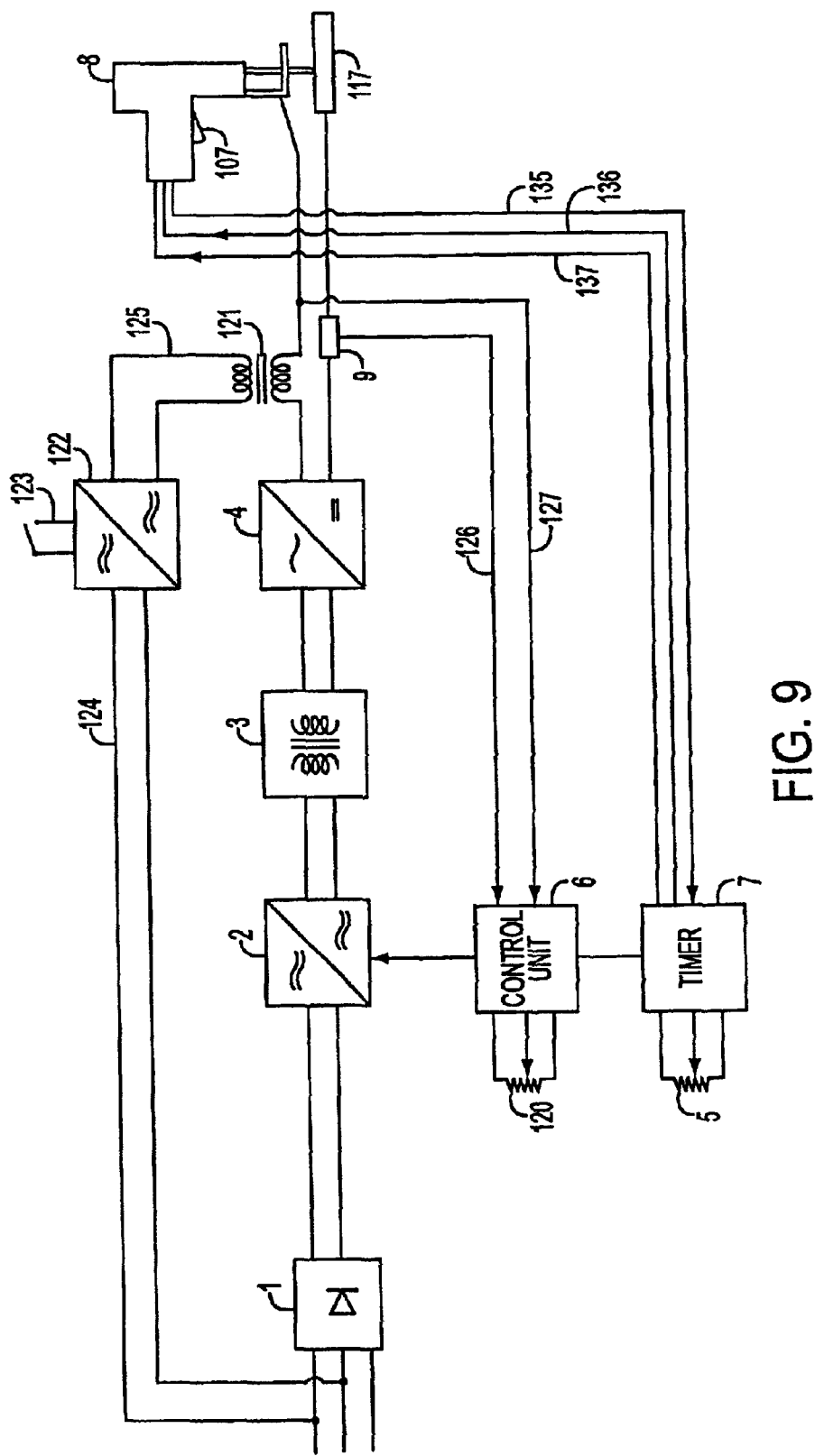
FIG. 9 is a block diagram showing an overall stud welder apparatus, similar to the welder of FIG. 1, incorporating a high voltage generator to ensure penetration of a painted object, according to a further preferred embodiment of the invention.

FIG. 9 is a block diagram of a stud welder apparatus incorporating a high voltage generator in order to ensure penetration of painted objects, according to another preferred embodiment of the invention. More specifically, when the stud welding process is performed on a painted, rusty or oily surface, the stud welder apparatus can deliver a high voltage high enough to penetrate the paint, rust, or oil on the base metal surface. The stud welding voltage is supplied during the high voltage pulse. The high voltage spark will create a conductive path through the paint, rust or the like, which will then more readily enable the stud current to flow.

The stud welder apparatus of FIG. 9 is similar to the welder apparatus of FIG. 1, except for the circuit elements 121, 122, 123, 124, and 125 for the high voltage generator. More specifically, FIG. 9 shows a stud welder apparatus with the stud gun 8 and a power supply circuit with a high voltage power supply or generator 122 included in the circuit. This power supply is connected on one of three phases via line 124. Line 125 is the output from the high voltage generator 122 which is connected to a low voltage side of a transformer 121. When a switch 123 is depressed, a high voltage pulse, for example, over 10,000 V, is delivered to the stud in the gun 8 via the leads to the gun 8. As the stud is touching the painted, rusty or oily base metal, that paint, rust or oil is pierced by the high voltage pulse when the switch 123 is depressed. The open circuit voltage is applied almost simultaneously or slightly before the spark for the current is generated. Accordingly, when the spark is generated, that spark will generate a conductive path through the paint or rust which is used by the stud current to establish contact with the base metal and therefore enable a full current to flow and complete the welding of the stud.

Figure 10:
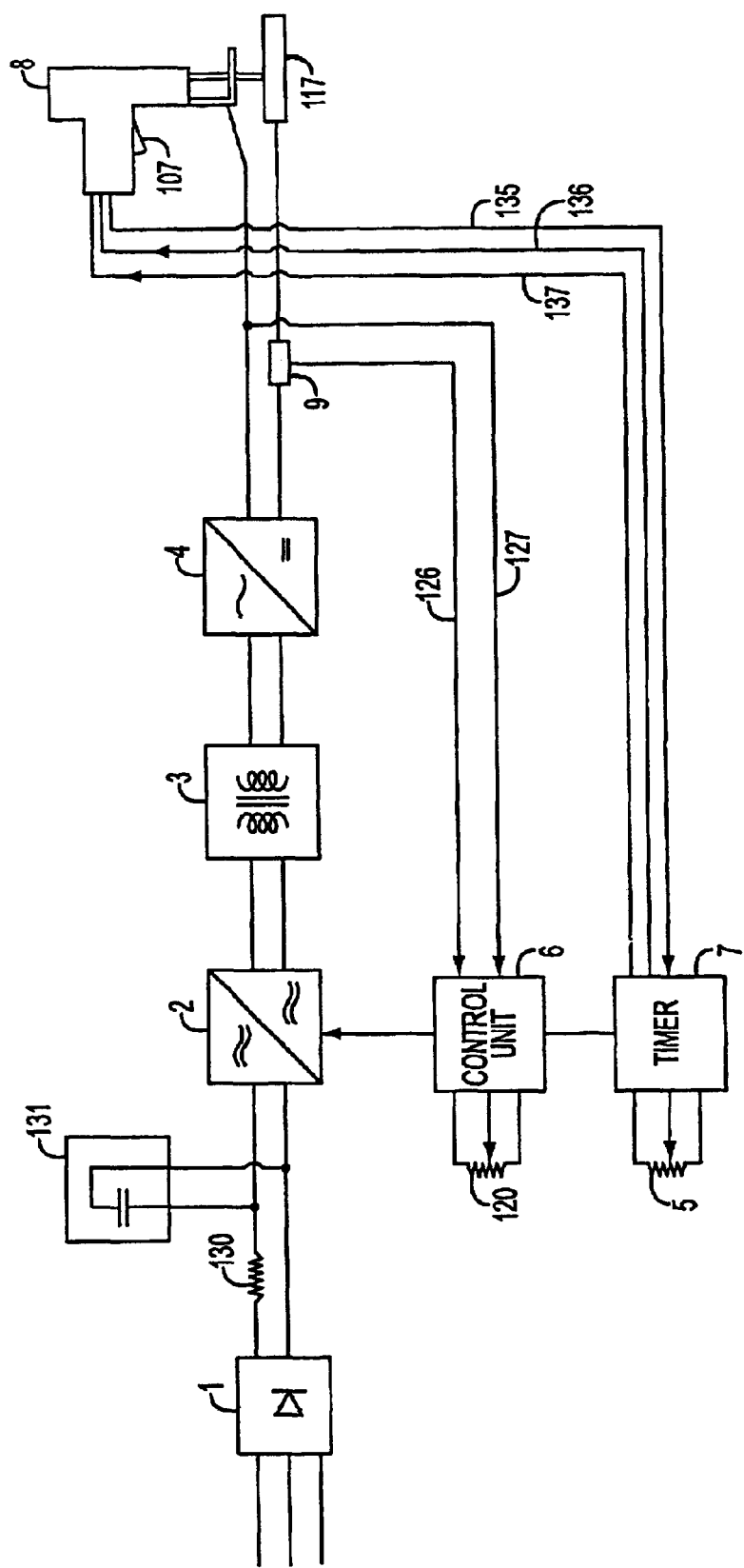
FIG. 10 is a block diagram showing an overall stud welder apparatus, similar to the welder FIG. 1, incorporating an electrical storage device to reduce current surge and thereby a fuse size needed for the stud welding apparatus according to another preferred embodiment of the invention.

FIG. 10 is a block diagram of a stud welder apparatus incorporating an electrical storage device for reducing current surge and thereby fuse size according to another embodiment of the invention. More specifically, FIG. 10 describes a stud welder apparatus having a power supply and processing circuit with an electronic storage device included to reduce the peak current drawn when welding a stud. As described above, a stud welder apparatus draws high current during the stud welding process, namely the current draw during the short time interval, such as 1 second or less, when the stud is welded. When delivering a 1200 A to the stud, the current on the primary side of the power supply is 70 A per phase on a 480 V line. This type of current needs a 40 A circuit breaker or 30 times delay fuse. When welding on a 240 V single phase, the current per phase can exceed 300 A.

The stud welder apparatus of FIG. 10 is similar to the welder apparatus of FIG. 1, except for the circuit elements 130 and 131. In the stud welding process noted above, the current can charge a battery or capacitor bank 131 during the time when no current is drawn. The time when no current is flowing can exceed approximately 10 seconds, and when the high current is flowing the time is approximately 1 second or less. If a large capacity or battery bank 131 is used to charge during the time period of no current draw and used to deliver a stud current during the welding of the stud, the current can be reduced by a factor of 10 times. As also shown in FIG. 10, a resistor 130 is used to limit the current during the stud processing time.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A stud welder apparatus comprising:
   a drawn arc stud applying device; and a drawn arc stud processing circuit that continuously measures the degree of melting off when making the stud and stops delivery of energy to the stud applying device if the melting off progress indicates that the stud will not receive sufficient energy at the end of the stud process in sufficient time that the stud process can be stopped before an unacceptable stud has been created by pulling back the stud before a molten stud has cooled down.

2. A stud welder apparatus comprising:

a drawn arc stud applying device; and a drawn arc stud processing circuit that measures energy at regular time intervals, extrapolates a forecasted ending energy based upon a predetermined energy, and adjusts at time intervals a current to the stud applying device so that the ending energy is correct.

3. A stud welder apparatus as recited in claim 2, wherein the processing circuit calculates by extrapolation total energy that will be delivered after the stud process is completed by calculating continuously during the stud process an accumulated watt seconds per accumulated millisecond and continuously adjusting the current so as to arrive at a total desired watt seconds when the stud process is terminated.

* * * * *